Nov. 11, 1924.  1,514,864
W. A. SHULER
RIM FOR VEHICLE TIRES AND WHEELS
Filed Nov. 29, 1920    2 Sheets-Sheet 1
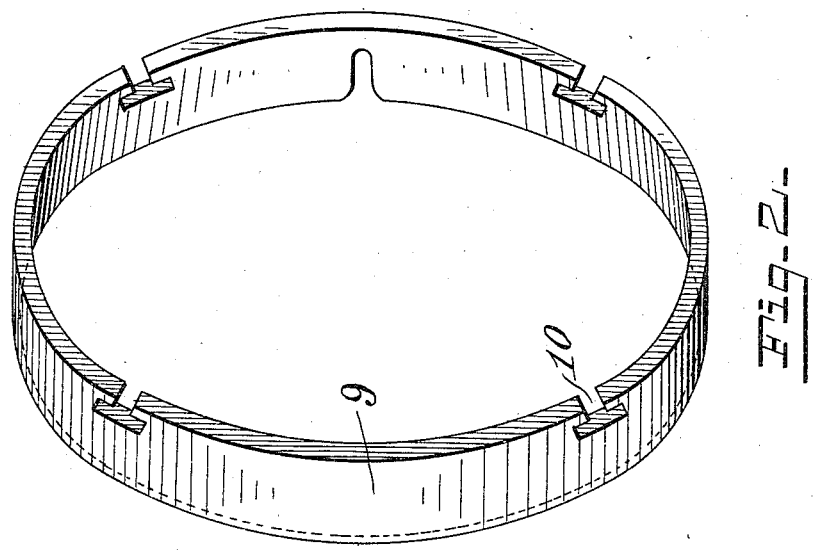
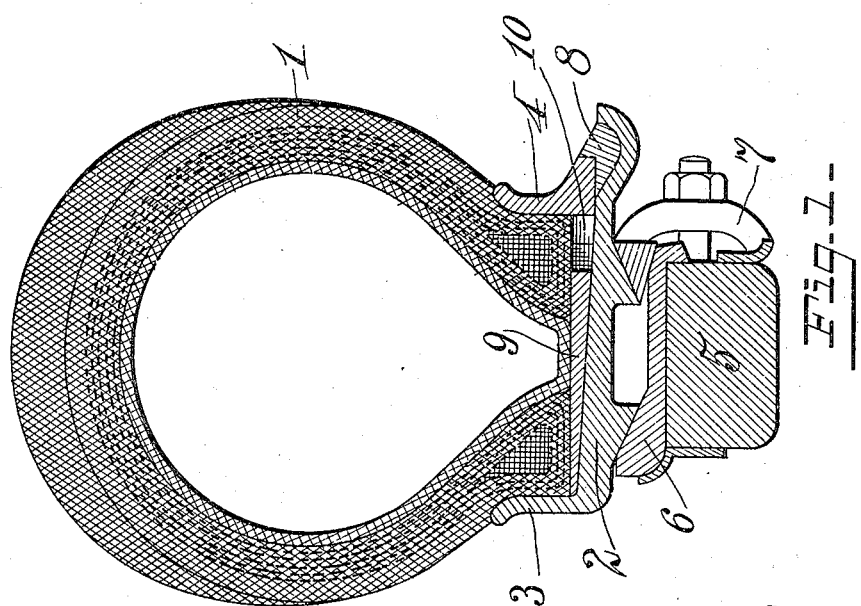
Inventor
WM. A. SHULER.

Nov. 11, 1924.
W. A. SHULER
1,514,864
RIM FOR VEHICLE TIRES AND WHEELS
Filed Nov. 29, 1920   2 Sheets-Sheet 2
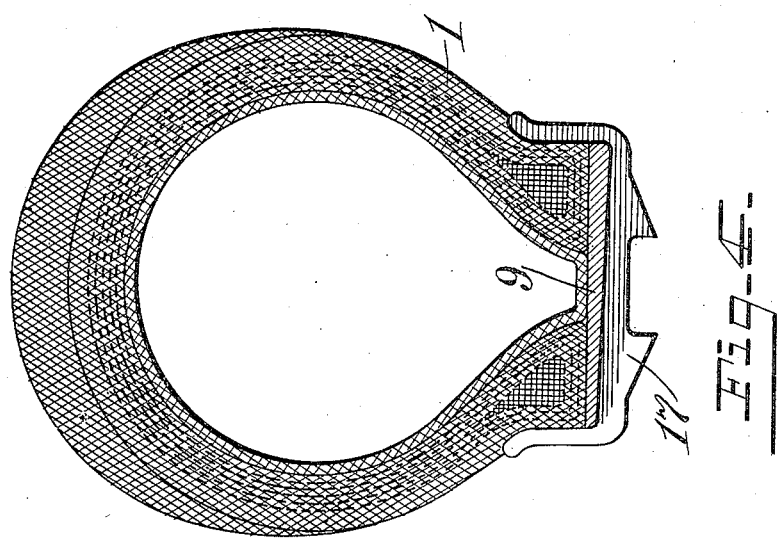
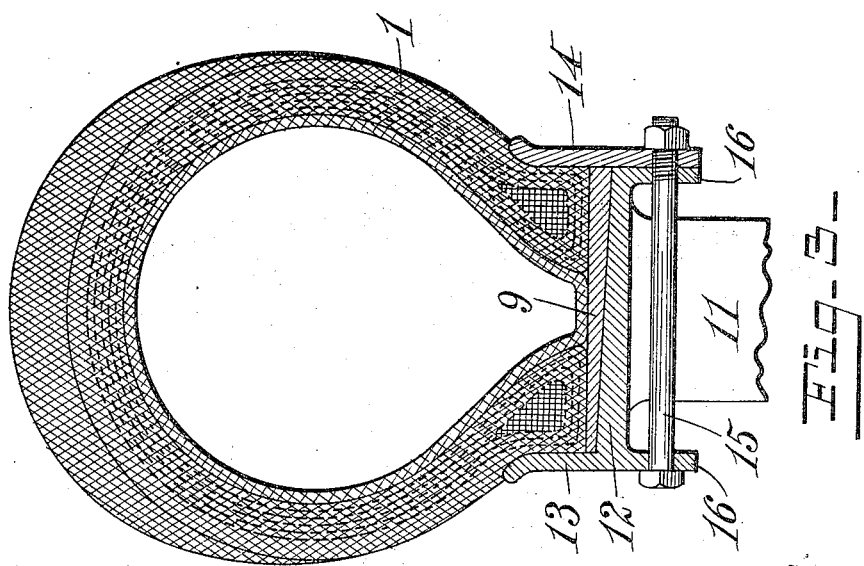
Inventor
WM. A. SHULER.

Patented Nov. 11, 1924.

1,514,864

UNITED STATES PATENT OFFICE.

WILLIAM A. SHULER, OF NEW ORLEANS, LOUISIANA.

RIM FOR VEHICLE TIRES AND WHEELS.

Application filed November 29, 1920. Serial No. 426,914.

*To all whom it may concern:*

Be it known that I, WILLIAM A. SHULER, a citizen of the United States, residing at New Orleans, in the parish of Orleans and State of Louisiana, have invented certain new and useful Improvements in Rims for Vehicle Tires and Wheels, of which the following is a specification, reference being had therein to the accompanying drawing.

This invention relates to rims for vehicle tires.

As is well known, when an automobile tire has remained on the rim for a long period of time it is frequently very difficult to remove the same, due to various causes, not the least of which is the tendency of the rubber of the tire to adhere to the rim; further, this difficulty is increased by the fact that owing to the valve stem extending through the rim of the wheel it is necessary to remove one side of the tire in advance of the other, thus tilting the tire and causing the same to bind.

The object of the present invention is to provide means whereby a tire can be quickly and easily removed from its rim.

A further object of the invention is to provide a device which will enable the tire to be quickly and easily removed from its rim and which will be of a very simple, inexpensive construction, and which may be applied to rims of various kinds.

Other objects of the invention may appear as the device is described in detail.

In the accompanying drawings Fig. 1 is a cross sectional view of a pneumatic tire and a supporting rim showing my invention applied thereto; Fig. 2 is a perspective view of the annular band; Fig. 3 is a transverse sectional view of the rim of a cast metal wheel showing the invention applied thereto; and Fig. 4 is a similar view of a demountable rim of the split type showing the invention applied thereto.

In carrying out my invention I interpose between the rim and the tire an intermediate member which will not adhere to the rim and which can be easily removed therefrom. This intermediate member is preferably in the form of an annular band of a width substantially equal to the base of the tire and having its inner and outer surfaces flat so that it comprises in effect a portion of the rim itself. This intermediate member may be applied to rims of varius kinds whether separate from or integral with the wheel, and it will be understood that the several applications of the invention here illustrated have been chosen for the purpose of illustration only.

In Fig. 1 of the drawings I have shown the invention applied to a demountable rim having mounted thereon a pneumatic tire. In this drawing the tire is shown at 1 and is mounted upon a rim 2, between the flanges 3 and 4 thereof, the flange 4 being removable from the rim to permit of the removal of the tire. The rim is mounted on a felloe 5 having an outer band 6 on which the rim itself is mounted and to which the rim is secured by suitable fastening devices 7. The removable flange 4 is held in its assembled position by means of a ring 8 seated in an annular groove carried by the rim, and from which it can not be removed so long as the rim is mounted on the felloe.

Ordinarily the tire 1 is mounted directly upon the flat surface of the rim 2 between the flanges and when the tire adheres or sticks, for any reason whatsoever, to the rim it is very difficult to impart thereto the lateral movement necessary to its removal from the rim. To overcome this difficulty I have, as above explained, inserted between the tire and the rim an intermediate member in the form of an annular band, or ring, 9 which is of a width substantially equal to the distance between the two flanges and which has its inner and outer surfaces flat so that the band itself will rest firmly upon the surface of the rim and the base of the tire will rest upon the outer surface of the band in the same manner as it would rest upon the rim itself. Preferably the band is thicker at one edge than at the other so as to give the same a wedge shape in cross section. The thicker edge of the band is arranged adjacent to the removable flange 4 and, consequently, when this flange has been removed the band may be withdrawn from the rim. In order that the outer surface of the band may be parallel with the axis of the wheel, thus maintaining the tire beads in their proper relative positions, the rim may, if desired, be thickened at one side so as to provide the same with an inclined surface upon which the wedge shaped band will rest. Ordinarily, because of its tapered construction, the band can be very readily withdrawn from between the rim and the tire, thus leaving the tire loose upon the rim and easily removable therefrom. Should the tire adhere to the band it can usually be loosened therefrom because of the wedge shape of the intermediate band but if it cannot be loosened from the tire the latter will be removed from the rim along with the band and the band may then be readily separated from the tire. To facilitate the removal of the band I have provided the same in its thickened edge with openings, here shown as T-shaped recesses 10, into which a suitable tool may be inserted to grasp the band and withdraw the same from the rim.

In Fig. 3 of the drawings I have shown the invention as applied to a cast metal wheel in which the rim 12 is cast integral with the spokes 11. One flange 13 is formed integral with the body of the rim 12 and the other flange 14 is removably mounted on the rim and held in position thereon by bolts 15 extending through the inwardly extending portions, or flanges, 16 carried by the rim. The tire 1 is held between the flanges 13 and 14 and the invention is applied thereto in the same manner as that described in connection with the form shown in Fig. 1, that is, a band, wedge shaped in cross section, is interposed between the outer surface of the rim and the tire and is held between the flanges of the rim.

In Fig. 4 I have shown the invention as applied to a rim 17 of the split type, that is, a rim which is split transversely at one point in its circumference and which has sufficient resilience to permit the same to be sprung or bent into or out of engagement with the tire, the flanges being formed integral with the rim. In this form of the device the band 9, which is shown as a continuous annular band is placed within the rim by contracting the latter in the usual manner.

The invention will be readily understood from the foregoing description and it will be apparent that I have interposed between the rim and the tire, regardless of the character of either, an annular band which will prevent the tire from adhering to the rim itself and will greatly facilitate the removal of the tire. By the removal of this band the tire is so loosened on the rim that it can easily be tilted in removing the same as is necessitated by the valve stem extending through the rim. Inasmuch as this band is of relatively small thickness and occupies the full area of the space between the rims it will be apparent that the interposition of the band will not appreciably affect the position of the tire with relation to the rim and that it will not add materially to the width of the wheel.

While I have shown and described one embodiment of my invention I wish it to be understood that I do not desire to be limited to the details thereof as various modifications may occur to a person skilled in the art; for example the annular band need not necessarily be formed in one piece.

Having now fully described my invention what I claim as new and desire to secure by Letters Patent, is:

The combination with a rim adapted to receive a tire and having flanges at its edges to retain said tire thereon, one of said flanges being removable, of a circular band of relatively thin material extending about said rim to support said tire out of contact with said rim, said band having recesses adjacent to said removable flange to receive a tool by means of which said band may be laterally removed from said rim.

In testimony whereof, I affix my signature hereto.

WILLIAM A. SHULER.